Figure 1:
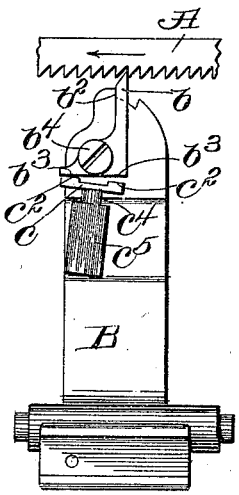

No. 635,079. Patented Oct. 17, 1899.
J. B. PRICE.
TYPE WRITING MACHINE.
(Application filed May 8, 1899.)

(No Model.)

Witnesses
Nancy P. Ford
Jas. J. Maloney

Inventor,
John B. Price,
by J. P. and J. J. Livermore
Att'ys.

THE NORRIS PETERS CO., PHOTO-LITHO., WASHINGTON, D. C.

UNITED STATES PATENT OFFICE.

JOHN B. PRICE, OF NEWARK, NEW JERSEY, ASSIGNOR TO THE MANHATTAN TYPEWRITER COMPANY, OF NEW JERSEY.

TYPE-WRITING MACHINE.

SPECIFICATION forming part of Letters Patent No. 635,079, dated October 17, 1899.

Application filed May 8, 1899. Serial No. 716,015. (No model.)

*To all whom it may concern:*

Be it known that I, JOHN B. PRICE, of Newark, county of Essex, and State of New Jersey, have invented an Improvement in Type-Writing Machines, of which the following description, in connection with the accompanying drawings, is a specification, like letters on the drawings representing like parts.

The present invention relates to a type-writing machine, and is embodied in a novel construction of the escapement or paper-carriage-feed mechanism, the invention consisting especially in a novel construction of the let-off dog and its centering-spring.

The invention is shown as embodied in that form of escapement which is used in the Remington machine, in which form the retaining and let-off dogs move transversely across a rack or its equivalent properly connected with the paper-carriage.

In the escapement forming the subject of this invention the let-off dog is provided with a centering device which normally holds it in such a position relative to the retaining-dog that when the said retaining-dog is moved out of engagement with a tooth of the rack the let-off dog will be moved into engagement with the rack, the said let-off dog being then capable of independent movement, so as to permit the rack to advance the distance between two teeth and to be arrested by the engagement of the let-off dog with a stop at the end of such movement. Furthermore, when the carriage is restored or moved backward without lifting the rack, as is often the case, provision is made for permitting the loose dog to yield in the opposite direction, so that the rack will ratchet along the same without resistance. The centering device therefore operates to hold the loose dog when left to itself in the proper position with relation to the retaining-dog for reëngagement with the rack-teeth and also admits of a yielding movement of the said dog in either direction, as may be required in the operation of the machine.

In accordance with the present invention the centering device comprises a longitudinally-movable spring-pressed plunger having bearing-surfaces arranged to engage corresponding bearing-surfaces on the let-off dog, one of the latter surfaces being at each side of the axis of the dog in the direction of movement thereof. The said plunger is contained in a guide-socket, shown as adjustably mounted, it being obvious that by adjusting the position of the said socket the initial position of the bearing-surfaces, and consequently that of the let-off dog, may be correspondingly adjusted. A movement of the said let-off dog in either direction, however, is permitted by the yielding of the plunger, which in returning to its normal position immediately restores the said dog to its centered position when said dog is left to itself.

Figure 2:
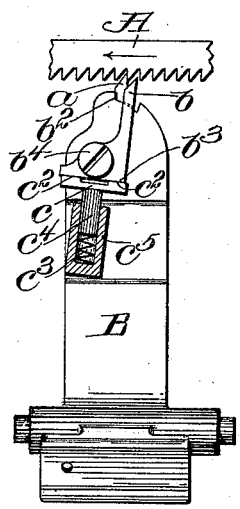
Figure 3:
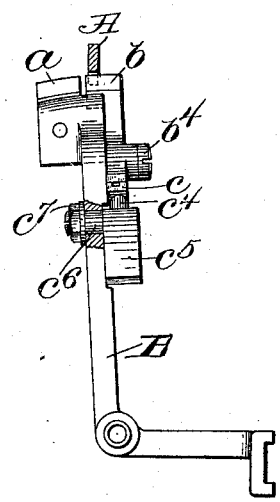
Figure 4:
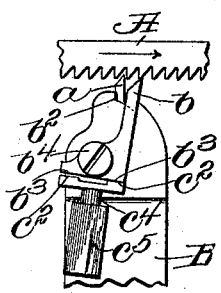

Figure 1 is a rear elevation of the paper-carriage-feed mechanism embodying the invention; Fig. 2, a similar view showing the parts in a different position; Fig. 3, a side elevation, the carriage-rack being shown in section; and Fig. 4, a view similar to Fig. 1, showing the parts in the position assumed when the carriage is being moved backward.

The retaining-dog $a$ and let-off dog $b$, which are arranged to coöperate with the carriage-rack A or its equivalent, (such as a toothed wheel geared to the carriage,) are supported on a rocker member B, which is adapted to be rocked in response to a movement of any of the key-levers or of the space-bar lever to carry the dogs $a$ and $b$ transversely across the rack A, so that as one of the said dogs moves out of engagement with said rack the other dog will be moved into engagement therewith. If, for example, the rocker B is moved when the parts are in the position shown in Fig. 2, the dog $a$ will pass out of engagement with one of the teeth and the dog $b$ at the same time will come into engagement with the next tooth and will then permit the carriage to move until the said dog $b$ brings up against a suitable stop $b^2$. It is necessary, therefore, that the said dog $b$ should be yieldingly held in the proper position to engage a tooth of the rack in the movement of the rocker, and this is accomplished in accordance with the present invention by the use of the centering device $c$, which is provided with engaging surfaces $c^2$, coöperating with corresponding engaging surfaces or portions $b^3$ formed on a part of the dog $b$, one of said surfaces being at one side of the axis or pivotal support $b^4$ and the other at the other side thereof.

The centering device $c$ is arranged to be pressed into engagement with the surfaces $b^3$ by means of a spring $c^3$, shown as acting upon a plunger or stem $c^4$, contained in a suitable guide $c^5$, it being obvious that the tendency of the parts when left to themselves will be to assume the position shown in Fig. 2—that is, with both sets of surfaces in engagement—although the dog is free to yield in either direction when a force is exerted at either side of the engaging end thereof. By this construction, furthermore, it is obvious that the initial position of the let-off dog will depend upon the position of the plunger $c^4$, so that by adjusting the position of said plunger the initial position of the dog can be correspondingly adjusted. As herein shown, the plunger guide or socket $c^5$ is pivotally connected with the rocker B, the said socket $c^5$ being shown as provided with a projection $c^6$, extending through a suitable opening in the rocker B and adapted to be held fixed in the said opening by means of a nut $c^7$. To properly adjust the dog $b$, therefore, it is necessary only to loosen the nut $c^7$ and to turn the socket $c^5$ until the direction of the plunger $c^4$ is such as to properly position the dog $b$, the adjustment then being fixed by tightening the said nut. By this construction the dog is properly held in its initial position, can be readily adjusted, and will not be affected (so far as its proper operation is concerned) by a slight weakening of the spring, as might be the case when the action of the spring is not such as to provide in the same way for the yielding of the dog in either direction.

I claim—

1. In a type-writing machine, the combination with a retaining-dog; of a pivotally-supported let-off dog provided with engaging surfaces, one at each side of its axis; a centering device comprising a plunger provided with corresponding engaging surfaces one at each side; a guide-socket for said plunger; and a spring adapted to press said plunger outward with relation to said guide-socket to maintain the same in engagement with the said dog, as set forth.

2. The combination with the retaining-dog; of the pivotally-supported let-off dog provided with engaging surfaces one at each side of its axis; a centering device comprising a plunger provided with corresponding engaging surfaces, one at each side thereof; a guide-socket for said plunger; a spring adapted to press said plunger outward with relation to said guide-socket to maintain the same in engagement with the said dog; and means for adjusting the said socket to vary the direction in which the said plunger is pressed, substantially as described.

In testimony whereof I have signed my name to this specification in the presence of two subscribing witnesses.

JOHN B. PRICE.

Witnesses:
FRANK A. LEMAL,
FRED KELLY.